(12) United States Patent
Boeke et al.

(10) Patent No.: US 10,329,937 B2
(45) Date of Patent: Jun. 25, 2019

(54) FLOWPATH COMPONENT FOR A GAS TURBINE ENGINE INCLUDING A CHORDAL SEAL

(71) Applicant: United Technologies Corporation, Farmington, CT (US)

(72) Inventors: Mark A. Boeke, Plainville, CT (US); Jeffrey J. DeGray, Somers, CT (US); Richard M. Salzillo, Jr., Plantsville, CT (US)

(73) Assignee: United Technologies Corporation, Farmington, CT (US)

( * ) Notice: Subject to any disclaimer, the term of this patent is extended or adjusted under 35 U.S.C. 154(b) by 375 days.

(21) Appl. No.: 15/267,632

(22) Filed: Sep. 16, 2016

(65) Prior Publication Data

US 2018/0080334 A1    Mar. 22, 2018

(51) Int. Cl.
| | | |
|---|---|---|
| F02C 3/04 | (2006.01) | |
| F01D 11/00 | (2006.01) | |
| F01D 5/06 | (2006.01) | |
| F01D 9/04 | (2006.01) | |

(52) U.S. Cl.
CPC .............. *F01D 11/005* (2013.01); *F01D 5/06* (2013.01); *F01D 9/041* (2013.01); *F01D 11/001* (2013.01); *F02C 3/04* (2013.01); *F05D 2220/32* (2013.01); *F05D 2240/35* (2013.01); *F05D 2240/55* (2013.01); *F05D 2250/71* (2013.01)

(58) Field of Classification Search
CPC ........ F01D 11/001; F01D 11/005; F01D 5/06; F01D 9/041; F02C 3/04; F05D 2220/32; F05D 2240/35; F05D 2240/55; F05D 2250/71
See application file for complete search history.

(56) References Cited

U.S. PATENT DOCUMENTS

| | | | | |
|---|---|---|---|---|
| 3,938,906 | A | * | 2/1976 | Michel ................. F01D 11/005 415/139 |
| 4,863,343 | A | * | 9/1989 | Smed ..................... F01D 9/042 415/138 |
| 5,149,250 | A | | 9/1992 | Plemmons et al. |
| 5,657,998 | A | | 8/1997 | Dinc et al. |
| 5,839,878 | A | * | 11/1998 | Maier .................... F01D 9/042 415/209.2 |
| 5,848,874 | A | * | 12/1998 | Heumann .............. F01D 9/042 415/189 |
| 6,164,908 | A | * | 12/2000 | Nishida .................... F01D 9/02 415/173.7 |
| 6,572,331 | B1 | | 6/2003 | Mohammed-Fakir et al. |

(Continued)

FOREIGN PATENT DOCUMENTS

| | | |
|---|---|---|
| EP | 1323897 | 7/2003 |
| EP | 3020929 | 5/2016 |
| EP | 3054099 | 8/2016 |

OTHER PUBLICATIONS

The Extended European Search Report for EP Application No. 17191286.8, dated Dec. 15, 2017.

*Primary Examiner* — Jesse S Bogue
(74) *Attorney, Agent, or Firm* — Carlson, Gaskey & Olds, P.C.

(57) ABSTRACT

A flow path component includes a platform having at least one radially aligned face. A chordal seal extends axially from the radially aligned face. The chordal seal includes a first curved face configured to prevent edge line contact under deflection conditions while the flow path component is installed in an engine.

15 Claims, 4 Drawing Sheets

(56) References Cited

U.S. PATENT DOCUMENTS

| | | |
|---|---|---|
| 6,599,089 B2 | 7/2003 | Aksit et al. |
| 6,719,295 B2 * | 4/2004 | Mohammed-Fakir ............... F01D 11/005 277/411 |
| 8,070,427 B2 * | 12/2011 | Snook ............... F01D 11/005 415/191 |
| 8,858,169 B2 * | 10/2014 | Dakowski ............... F01D 9/042 415/190 |
| 9,109,448 B2 | 8/2015 | Ivakitch et al. |
| 9,863,259 B2 * | 1/2018 | Boeke ............... F01D 9/042 |
| 10,113,436 B2 * | 10/2018 | Rioux ............... F01D 5/12 |
| 2005/0244267 A1 * | 11/2005 | Coign ............... F01D 9/023 415/189 |
| 2006/0099070 A1 | 5/2006 | Suciu et al. |
| 2013/0153304 A1 * | 6/2013 | Crawford ............... E21B 10/60 175/228 |
| 2015/0300185 A1 * | 10/2015 | Helvaci ............... F01D 9/041 415/191 |

* cited by examiner

FLOWPATH COMPONENT FOR A GAS TURBINE ENGINE INCLUDING A CHORDAL SEAL

TECHNICAL FIELD

The present disclosure relates generally to flowpath components for gas powered turbines, and more specifically to a flowpath component including a chordal seal.

BACKGROUND

Gas powered turbines generally include a compressor section that draws in and compresses air, a combustor section where the compressed air is mixed with a fuel and ignited, and a turbine section across which the resultant combustion products are expanded. The expansion of the combustion products drives the turbine to rotate, which in turn drives the compressor.

Gas flow through the primary flowpath is controlled and directed by multiple flowpath spanning components. In order to prevent gas traveling through the flowpath from escaping the flowpath at the joints between the flowpath spanning components and adjacent inner and outer diameter walls, seals are typically incorporated into one or more of the flowpath component surfaces. The seals prevent leakage between the inner and outer diameter portions of the flowpath spanning components and adjacent components defining the inner and outer diameter walls of the flowpath.

During operation of the engine, the relative positions of flowpath components can shift due to various mechanical stresses and thermal expansions and contractions. The relative position shift is referred to as deflection and can cause certain types and configurations of seals to misalign, allowing leakage from the flow path through the seals designed to prevent leakage.

SUMMARY OF THE INVENTION

In one exemplary embodiment a flow path component includes a platform including at least one radially aligned face, a chordal seal extending axially from the radially aligned face, and wherein the chordal seal includes a first curved face configured to prevent edge line contact under deflection conditions while the flow path component is installed in an engine.

In another exemplary embodiment of the above described flow path component the radius of curvature of the first curved face is in the range of 0.3 to 0.7 inches (0.76 to 1.78 centimeters).

In another exemplary embodiment of any of the above described flow path components the radius of curvature of the first curved face is approximately 0.5 inches (1.27 centimeters).

In another exemplary embodiment of any of the above described flow path components the chordal seal includes at least one clearance cut intrusion protruding into the chordal seal.

In another exemplary embodiment of any of the above described flow path components the at least one clearance cut intrusion has a radially outward facing radius of curvature.

In another exemplary embodiment of any of the above described flow path components the radially outward facing radius of curvature is in the range of 7.0 to 7.6 inches (17.78 to 19.30 centimeters).

In another exemplary embodiment of any of the above described flow path components the radially outward facing radius of curvature is in the range of 7.2 to 7.4 inches (18.29 to 18.80 centimeters).

In another exemplary embodiment of any of the above described flow path components the radially outward facing radius of curvature is approximately 7.3 inches (18.6 centimeters).

In another exemplary embodiment of any of the above described flow path components a peak of the first curved face is approximately 10 inches (25.4 centimeters) from a centerline of the engine, while the flow path component is in an installed state.

Another exemplary embodiment of any of the above described flow path components further includes a second platform radially opposite the first platform and connected to the first platform via a flowpath body, the second platform including a second radially aligned face and a second chordal seal extending axially from the second radially aligned face.

In another exemplary embodiment of any of the above described flow path components the second chordal seal includes a second first curved face having a curvature approximately identical to the curvature of the first curved face.

In another exemplary embodiment of any of the above described flow path components a distance between a peak of the first curved face and a peak of the second curved face is in the range of 2.2 to 2.6 inches (5.59 to 6.60 centimeters).

In another exemplary embodiment of any of the above described flow path components the first platform includes a second radially aligned face opposite the first radially aligned face, wherein the second radially aligned face is a planar face.

In another exemplary embodiment of any of the above described flow path components the second radially aligned face is forward facing and has an angle of between 85 and 95 degrees relative to a centerline of the engine, while the flow path component is in an installed state.

In another exemplary embodiment of any of the above described flow path components the angle is approximately 90 degrees.

In another exemplary embodiment of any of the above described flow path components the flowpath component is a first stage high pressure turbine vane.

In another exemplary embodiment of any of the above described flow path components an edge line and a peak of the chordal seal are parallel.

In another exemplary embodiment of any of the above described flow path components the first curved surface includes a planar contact surface.

In one exemplary embodiment a gas turbine engine includes a compressor section, a combustor section fluidly connected to the compressor section, a turbine section fluidly connected to the combustor section, the turbine section including a plurality of turbine stages, each of the stages including a vane and a rotor, and wherein at least one of the vanes includes a platform including at least one radially aligned face, a chordal seal extending axially from the radially aligned face, and the chordal seal includes a first curved face configured to prevent edge line contact under deflection conditions while the flow path component is installed in an engine.

An exemplary method for sealing a turbine flowpath during deflection conditions includes maintaining contact between a curved face of a first chordal seal of a first flowpath component and an adjacent first contact face of a second flowpath component, and maintaining contact between a curved face of a second chordal seal of the first flowpath component and an adjacent second contact face of the second flowpath component.

These and other features of the present invention can be best understood from the following specification and drawings, the following of which is a brief description.

DETAILED DESCRIPTION OF AN EMBODIMENT

Figure 1:
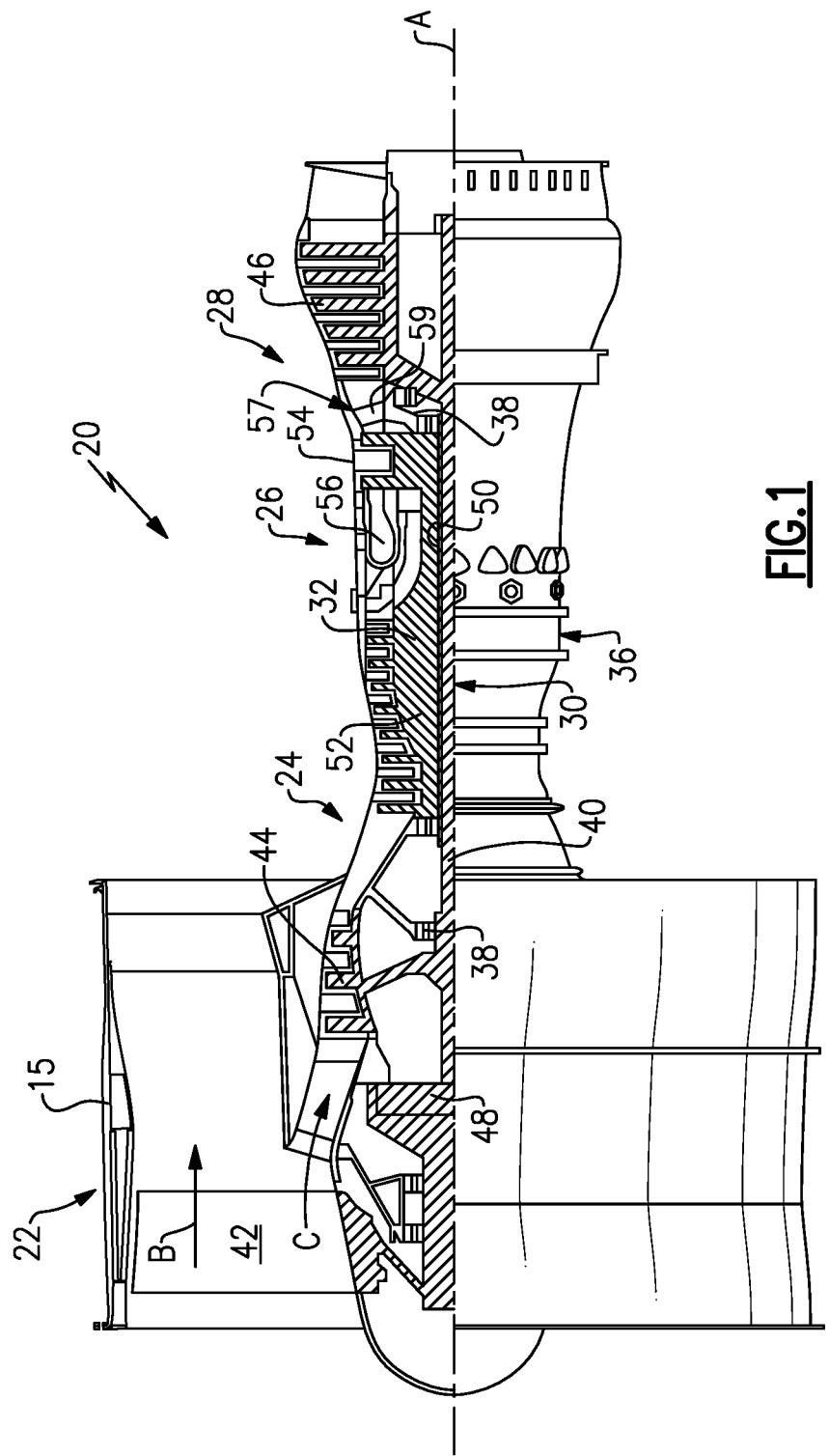
FIG. 1 schematically illustrates an exemplary gas powered turbine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

While described herein in the context of an exemplary gas turbine engine, one of skill in the art, having the benefit of the following disclosure, will understand that the gaspath component, and associated cooling system, described herein can be utilized in any gas powered turbine, including a land based turbine, a marine turbine, a test rig, or any other gas powered turbine construction.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/s).

During operation of the gas turbine engine 20, combustion products are provided from the combustor section 26 to the turbine section 28 along the primary flowpath. The turbine section 28 is constructed of multiple turbine stages, with each stage including a vane and a rotor. Within each stage, the flowpath is defined by an inner platform and an outer platform at the vane, and a blade platform and a blade outer air seal at the rotor. Each of the flowpath components is sealed to the adjacent flowpath components in order to prevent leakage of the combustion products from the flowpath, as leakage reduces the efficiency of engine operations.

Figure 2:
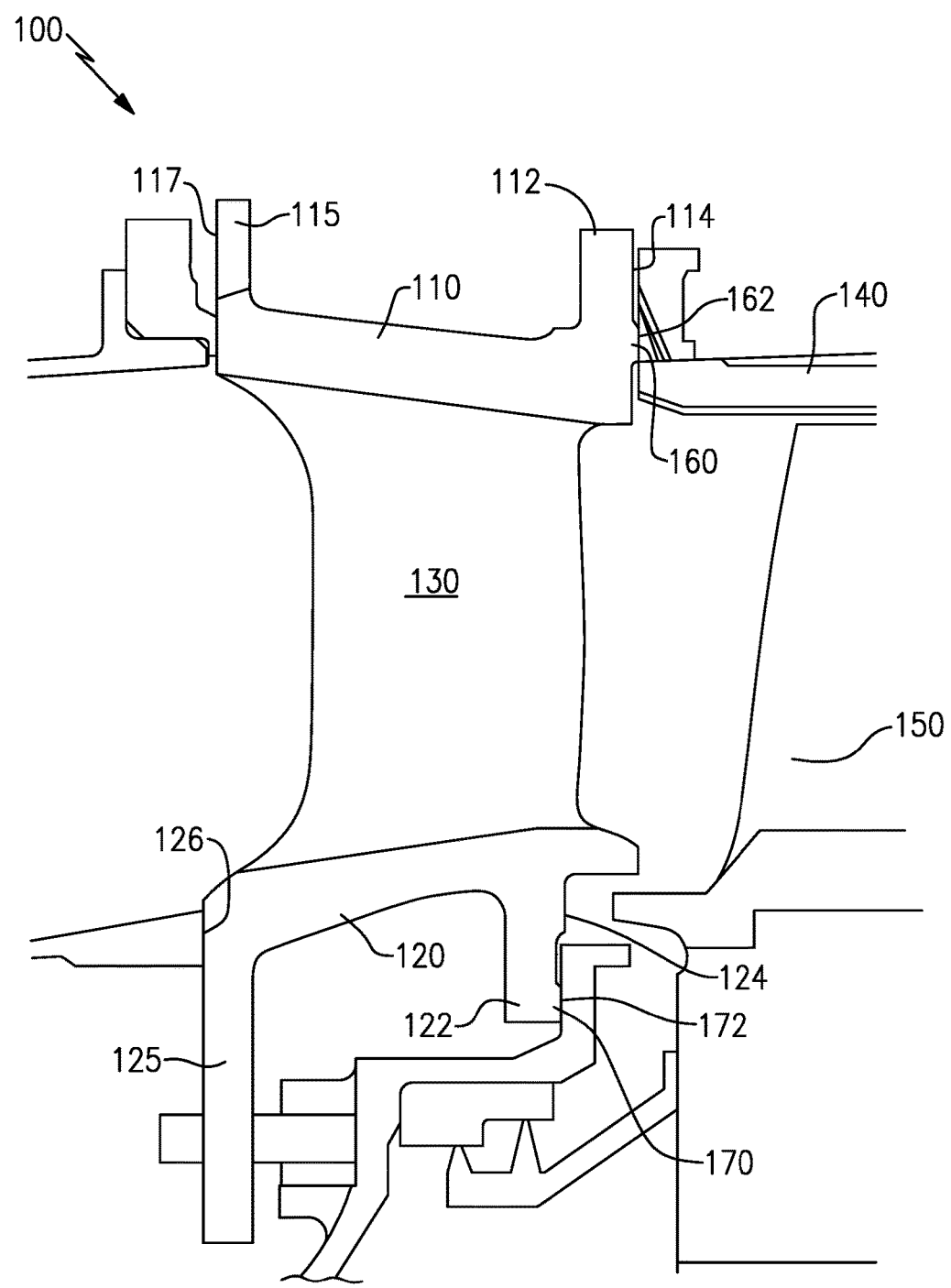
FIG. 2 schematically illustrates an example vane configuration for a $1^{st}$ stage of a high pressure turbine.

With continued reference to FIG. 1, FIG. 2 schematically illustrates an example turbine vane 100 in a first stage of the turbine section 28 of the engine 20. The vane 100 includes a radially outer platform 110, a radially inner platform 120, and a flowpath body 130 spanning from the radially outer platform 110 to the radially inner platform 120. Immediately downstream of the vane 100, on an outer diameter, is a blade outer air seal 140, and a rotor 150.

The radially outer platform 110 includes a radial extension 112 with a radially aligned face 114. Axially opposite the first radial extension 112 is a second radial extension 115. The second radial extension has a second radially aligned face 117. Extending axially from the first radial face 114 is a chordal seal 160. The chordal seal 160 contacts a corresponding face of the adjacent blade outer air seal 140, and prevents leakage from the cooling flow cavity between the vane 100 and the blade outer air seal 140. The chordal seal 160 is an axial protrusion from the first radially aligned surface 114, and extends a full circumferential length of the platform 110.

The chordal seal 160 includes a contact surface 162. The contact surface of the chordal seal 160 is curved. By curving contact surface 162, the seal is maintained when deflection occurs, and the relative positions of the vane 100 and the adjacent blade outer air seal 140 alter during engine operations. The radial position of the chordal seal 160 that is axially farthest from the surface 114 is referred to as the "peak" of the chordal seal 160. The radially outermost, and radially innermost portions of the chordal seal 160 are referred to as edge lines. In an exemplary nominal vane 100, the edge lines and the peak are parallel. In alternative implementations, the edge lines and the peak can be slightly off parallel.

Similarly, the radially inner platform 120 includes a radial extension 122 with a radially aligned face 124. Axially opposite the radial extension 122 is a second radial extension 125 having a second radially aligned face 126. Extending axially from the first radial face 124 is a second chordal seal 170. The second chordal seal 170 is substantially similar in both form and function to the first chordal seal 160, including the curved surface 172 contacting an adjacent flowpath component. The radial position of the chordal seal 170 that is axially farthest from the surface 114 is referred to as the "peak" of the chordal seal 170.

The forward radially aligned faces 117, 126 each contact a corresponding outer diameter and inner diameter duct wall, such as a combustor duct, and form a contact seal, further enhancing the ability of the vane 100 to seal during various operating conditions. In some alternate examples, the combustor duct can be positioned further radially inward than the illustrated example. In some such alternate examples, the corresponding chordal seals 160, 170 can include a planar contact surface at the peak, and the curved surface of the chordal seal is not a continuous curve.

Figure 3:
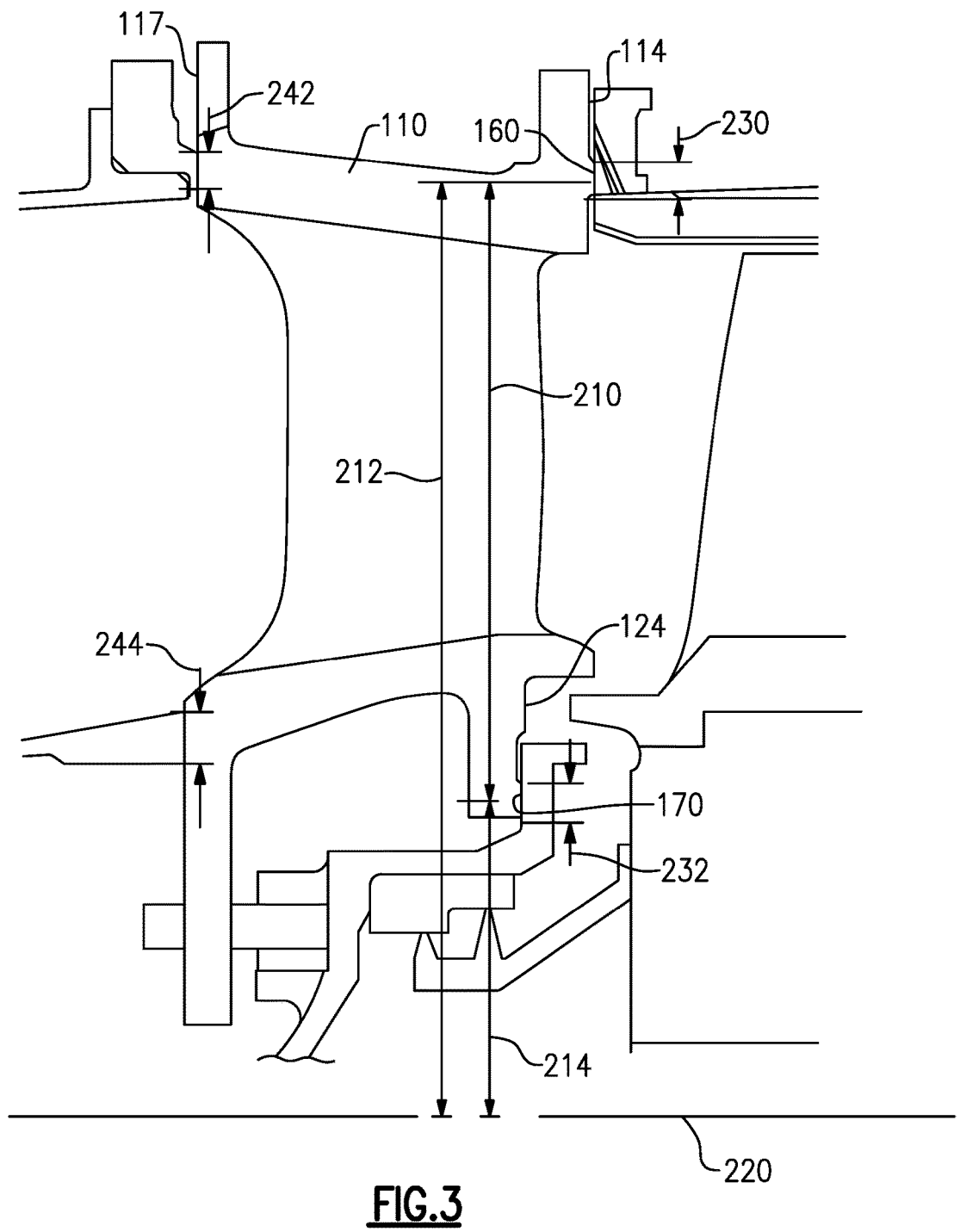
FIG. 3 schematically illustrates a specific embodiment of the example vane configuration of FIG. 2.

With continued reference to FIG. 2, and with like numerals indicating like elements, FIG. 3 schematically illustrates one specific embodiment of the flow path component configuration (vane 100) of FIG. 2. As described herein, the numerical values of the parameters are those of the vane 100 in an installed position in a non-operating (cold) engine. In order to interface properly with the adjacent flowpath components 140, 150, the peak of the first chordal seal 160 is separated from the peak of the second chordal seal 170 by a distance 210. In some examples the distance 210 is in the range of 2.2 inches to 2.6 inches (5.59 to 6.60 centimeters). In alternative examples the distance 210 is approximately 2.4 inches (6.1 centimeters), accounting for manufacturing tolerances.

Further, each of the chordal seals 160, 170 is defined in part by their radial distance 212, 214 from an engine centerline 220. The radial distance 212 of the outer chordal seal 160 is, in some examples, 10 inches (25.4 centimeters) from the engine centerline 220. The radial distance 214 of the inner chordal seal 170 is, in some examples, 7.4 inches (18.8 centimeters).

In order to ensure that the curved surfaces 162, 172 of the chordal seals 160, 170 maintain contact with the adjacent corresponding sealing surfaces, each of the curved surfaces is defined by a radius of curvature that protrudes away from the corresponding radially aligned surface 114, 124. The curved surfaces 162, 172 have, in some examples, a radius of curvature in the range of 0.3 to 0.7 inches (0.762 to 1.78 centimeters). In further examples, the radius of curvature of the chordal seals 160, 170 is approximately 0.5 inches (1.27 centimeters), accounting for manufacturing tolerances. In the example of FIG. 3, each of the chordal seals 160, 170 include approximately identical radiuses of curvature.

In one example, the outer chordal seal 160 has a radial height 230 (length along the engine radius) in the range of 0.1 to 0.2 inches (0.25 to 0.51 centimeters). In further examples, the radial height 230 of the outer chordal seal 160 is approximately 0.1 inches (0.254 centimeters) accounting for manufacturing tolerances. Similarly, the inner chordal seal 170 has a radial height 232 in the range of 0.1 to 0.2 inches (0.25 to 0.51 centimeters). In further examples, the radial height 232 of the inner chordal seal 170 is approximately 0.15 inches (0.381 centimeters), accounting for manufacturing tolerances.

In order to further ensure sealing of the primary flowpath, the second radially aligned face 117 of the outer platform 110 has a radial contact height 242 of approximate 0.3 inches (0.767 centimeters), accounting for manufacturing tolerances. The second radially aligned surface 126 of the inner platform 120 has a radial contact height 244 of approximately 0.3 inches (0.767 centimeters).

Further, the radially aligned surfaces 117, 127 at the contact points are positioned at an angle of between 85 and 95 degrees, relative to the engine centerline axis 220. In further examples, the radially aligned surfaces 117, 127 are positioned at an angle of approximately 90 degrees, relative to the engine centerline axis.

Figure 4:
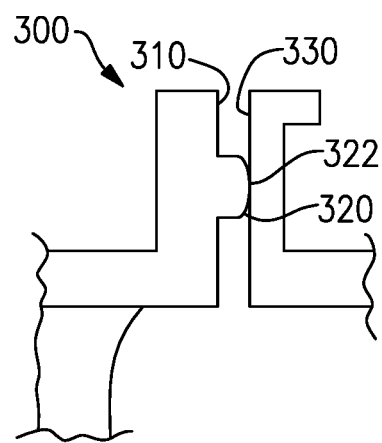
FIG. 4 schematically illustrates a chordal seal connection between a platform and an adjacent flowpath component.
Figure 5:
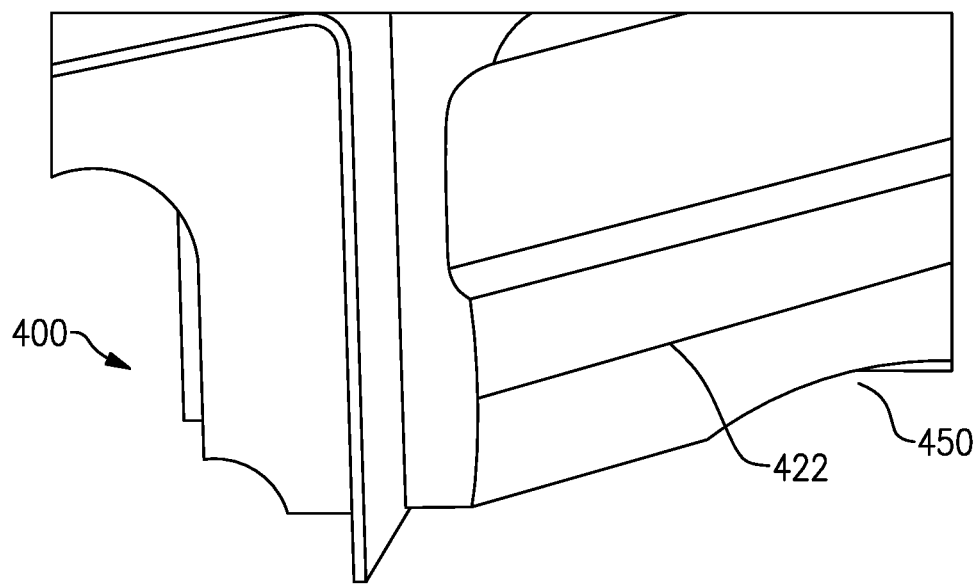
FIG. 5 schematically illustrates an isometric view of a chordal seal on an outer diameter platform.

With continued reference to FIGS. 2 and 3, FIG. 4 schematically illustrates a zoomed view of an exemplary chordal seal connection 300, with certain elements of the chordal seal exaggerated for explanatory purposes. The chordal seal 300 protrudes from a radially aligned surface 310, and includes a curved surface 320, that has a radius of curvature protruding away from the radially aligned surface 310 parallel to an engine centerline axis. The curved surface 320 contacts a corresponding face 330 of an adjacent flowpath component at a contact point 322. As the relative position between the chordal seal 300 and the adjacent component changes due to deflection at the contact point 322 shifts radially, relative to a radius of the gas turbine engine. The shifting contact point 322 is Due to the nature of the curved surface, as well as the sizing and relative positioning. The curvature of the curved surface 320 ensures that regardless of the magnitude of the deflection, a contact point 322 is maintained between the curved surface 320 and the adjacent component.

With continued reference to FIGS. 2-4, FIG. 5 illustrates an isometric view of an example chordal seal 400. The example chordal seal 400 is positioned on the radially inner platform (platform 120 in FIGS. 2 and 3), and seals against an adjacent sealing structure and a contact point 422 as described above. In addition to the above described features, the isometric view illustrates a clearance cut intrusion 450 extending radially outward into the chordal seal 400. The clearance cut intrusion accommodates adjacent engine components, such as a turbine on board injector (TOBI) system, or the like. In some examples, the clearance cut is a curved intrusion and the radius of curvature of the clearance cut 450 is in the range of 7.0 to 7.6 inches. In other examples, the radius of curvature is in the range of 7.2-7.4 inches (18.29 to 18.80 centimeters). In yet further examples, the radius of curvature is approximately 7.3 inches (18.6 centimeters), accounting for manufacturing tolerances.

While described above within the context of a high pressure turbine first stage vane, one of skill in the art will appreciate that some, or all, of the teachings can be applied to any number of flowpath components including, but not limited to, vanes and blade outer air seals.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A flow path component for a gas turbine engine, the flow path component comprising:
 a platform including at least one radially extending face, relative to a centerline axis of a gas turbine engine in which the flow path component is included;
 a chordal seal extending axially from said radially extending face, relative of the centerline axis;
 wherein the chordal seal includes a first curved face configured to prevent edge line contact under deflection conditions while the flow path component is installed in an engine; and
 wherein the chordal seal includes at least one clearance cut intrusion protruding into the chordal seal and having a radially outward facing radius of curvature.

2. The flow path component of claim 1, wherein the radius of curvature of the first curved face is in the range of 0.3 to 0.7 inches (0.762 to 1.778 centimeters).

3. The flow path component of claim 2, wherein the radius of curvature of the first curved face is 0.5 inches (1.27 centimeters).

4. The flow path component of claim 1, wherein the radially outward facing radius of curvature is in the range of 7.0 to 7.6 inches (17.78 to 19.304 centimeters).

5. The flow path component of claim 4, wherein the radially outward facing radius of curvature is in the range of 7.2 to 7.4 inches (18.288 to 18.796 centimeters).

6. The flow path component of claim 1, wherein the radially outward facing radius of curvature is 7.3 inches (18.542 centimeters).

7. The flow path component of claim 1, wherein a peak of said first curved face is 10 inches (25.4 centimeters) from a centerline of said engine, while said flow path component is in an installed state.

8. The flow path component of claim 1, further comprising a second platform radially opposite the first platform and connected to the first platform via a flowpath body, the second platform including a second radially extending face and a second chordal seal extending axially from the second radially extending face.

9. The flow path component of claim 8, wherein the second chordal seal includes a second first curved face having a curvature identical to the curvature of the first curved face.

10. The flow path component of claim 9, wherein a distance between a peak of said first curved face and a peak of said second curved face is in the range of 2.2 to 2.6 inches (5.588 to 6.604 centimeters).

11. The flow path component of claim 1, wherein the first platform includes a second radially extending face opposite the first radially extending face, wherein the second radially extending face is a planar face.

12. The flow path component of claim 11, wherein the second radially extending face is forward facing and has an angle of between 85 and 95 degrees relative to the centerline of the engine, while the flow path component is in an installed state.

13. The flow path component of claim 12, wherein the angle is 90 degrees.

14. The flow path component of claim 1, wherein the flowpath component is a first stage high pressure turbine vane.

15. A gas turbine engine defining a centerline axis and comprising:
 a compressor section;
 a combustor section fluidly connected to the compressor section;
 a turbine section fluidly connected to the combustor section, the turbine section including a plurality of turbine stages, each of said stages including a vane and a rotor, and wherein at least one of the vanes includes a platform including at least one radially extending face relative to the centerline axis, a chordal seal extending axially relative to the centerline axis from said radially extending face, and the chordal seal includes a first curved face configured to prevent edge line contact under deflection conditions while the flow path component is installed in the engine; and
 wherein the chordal seal includes at least one clearance cut intrusion protruding into the chordal seal and having a radially outward facing radius of curvature.

\* \* \* \* \*